US012623169B2

(12) United States Patent
Sibilia et al.

(10) Patent No.: US 12,623,169 B2
(45) Date of Patent: May 12, 2026

(54) DEVICE AND A METHOD FOR TANGENTIAL FLOW FILTRATION OF A FLUID

(71) Applicant: Levitronix GmbH, Zürich (CH)

(72) Inventors: Antony Sibilia, Dielsdorf (CH); Simon Stöckli, Dietlikon (CH)

(73) Assignee: Levitronix GmbH, Zürich (CH)

( * ) Notice: Subject to any disclaimer, the term of this patent is extended or adjusted under 35 U.S.C. 154(b) by 889 days.

(21) Appl. No.: 17/744,118

(22) Filed: May 13, 2022

(65) Prior Publication Data

US 2022/0395770 A1     Dec. 15, 2022

(30) Foreign Application Priority Data

Jun. 10, 2021     (EP) .................................... 21178687

(51) Int. Cl.
*B01D 29/90*          (2006.01)
*B01D 29/60*          (2006.01)
(Continued)

(52) U.S. Cl.
CPC ......... *B01D 29/908* (2013.01); *B01D 29/603* (2013.01); *B01D 29/606* (2013.01);
(Continued)

(58) Field of Classification Search
CPC ................ B01D 29/908; B01D 29/603; B01D 29/606; B01D 29/00; B01D 29/90; B01D 29/60;
(Continued)

(56) References Cited

U.S. PATENT DOCUMENTS 11,177,719 B2    11/2021  Holenstein
2019/0356195 A1*  11/2019  Holenstein ............ F04D 29/048

FOREIGN PATENT DOCUMENTS

EP        3570415 A     11/2019
GB        2272844 A  *  6/1994   .............. A61M 1/30
                    (Continued)

OTHER PUBLICATIONS

Martine Decloux et al.; "Treatment of acidic wastewater arising from the refining of vegetable oil by crossflow microfiltration at very low transmembrane pressure"; Process Biochemistry 42; c. 2007; Elsevier; pp. 693-699.

(Continued)

*Primary Examiner* — Akash K Varma
(74) *Attorney, Agent, or Firm* — Spencer Fane, LLP

(57)                    ABSTRACT

A device for tangential flow filtration includes a filter unit having first and second fluid openings, a filter element and a permeate opening, a first flow connection to connect the first fluid opening to a reservoir, a second flow connection to connect the second fluid opening to the reservoir, a first centrifugal pump in the first flow connection to convey the fluid from the reservoir to the filter unit, a first controller to actuate the first centrifugal pump, the filter unit designed such that the fluid for tangential flow filtration is capable of flowing substantially parallel to the filter element, a second centrifugal pump in the second flow connection, with which a counter-pressure is capable of being generated at the second fluid opening, and a second controller to actuate the second centrifugal pump.

13 Claims, 8 Drawing Sheets

(51) Int. Cl.

| | |
|---|---|
| *F04D 15/00* | (2006.01) |
| *F04D 25/06* | (2006.01) |
| *F04D 25/16* | (2006.01) |

(52) U.S. Cl.
CPC ......... *F04D 15/0066* (2013.01); *F04D 25/06* (2013.01); *F04D 25/16* (2013.01)

(58) Field of Classification Search
CPC ............... B01D 65/08; B01D 2311/04; B01D 2311/08; B01D 2311/14; B01D 2311/16; B01D 2311/2676; B01D 2313/243; B01D 2321/10; B01D 2321/20; B01D 2321/2025; B01D 61/08; B01D 61/10; B01D 61/18; B01D 61/20; B01D 61/22; B01D 61/28; B01D 61/30; B01D 61/32; B01D 61/12; B01D 61/00; B01D 27/00; B01D 2201/18; B01D 2201/184; F04D 15/0066; F04D 15/00; F04D 25/06; F04D 25/16; F04D 29/048; A61M 1/34; A61M 1/02; A61M 1/36; A61M 1/38; A61M 1/0218; A61M 1/3403; A61M 1/3601; A61M 1/3633; A61M 1/3635; A61M 1/16; A61M 60/113; A61M 60/232; A61M 60/37; A61M 60/422; A61M 60/554; A61M 60/849; C12M 1/00; C12M 1/26; G01N 33/49; F16C 32/04; H02K 7/09
USPC ........................................................ 210/202
See application file for complete search history.

(56) References Cited

FOREIGN PATENT DOCUMENTS

| WO | WO-0110540 A2 * | 2/2001 | .......... B01D 61/145 |
|---|---|---|---|
| WO | 2016145198 A1 | 9/2016 | |
| WO | 2020020569 A1 | 1/2020 | |

OTHER PUBLICATIONS

M. C. Michalski et al.; "Microfiltration of Raw Whole Milk to Select Fractions with Different Fat Globule Size Distributions: Process Optimization and Analysis"; Journal of Dairy Science; vol. 89, No. 10; c. 2006; American Dairy Science Corporation; pp. 3778-3790.

* cited by examiner

Fig.7

DEVICE AND A METHOD FOR TANGENTIAL FLOW FILTRATION OF A FLUID

CROSS-REFERENCE TO RELATED APPLICATION

This application claims priority to European Patent Application 21178687.6, filed Jun. 10, 2021, the contents of which is hereby incorporated in their entirety.

BACKGROUND

Field of the Invention

The disclosure relates to a device and a method for tangential flow filtration of a fluid. The disclosure further relates to a set of single-use parts for such a device.

Background Information

Conventional tangential flow filtration, which is also designated as cross-flow filtration, is a method of filtering fluids that is used, for example, in the biotechnology and chemical industries, as well as in the food and pharmaceutical industries. In conventional tangential flow filtration, the fluid to be filtered, for example a suspension, is guided parallel to a filter element, e.g., a filter membrane, at a flow velocity different from zero, and the permeate, also designated as filtrate, is removed transverse to the flow direction. Due to a relatively high flow velocity, having a filter cake or a cover layer building up on the filter element should be avoided.

Tangential flow filtration is often performed as a batch process in which the fluid to be filtered, for example a suspension, is taken from a reservoir, conveyed by a conveying pump through the filter unit with the filter element arranged therein, and then guided hack from the filter unit to the reservoir. The permeate, which passes through the filter element in the filter unit transverse to the flow direction, is discharged or removed through a permeate opening. Flexible tubes or flexible tube connections are often selected for the flow connections between the reservoir and the filter unit.

SUMMARY

In such processes, tangential flow filtration can be used to concentrate a fluid, e.g., a suspension, by circulating the suspension several times and in each case filtering out a liquid component, e.g., water or a nutrient solution, which is removed in each case as permeate, so that the suspension in the reservoir becomes increasingly concentrated. However, it is also possible to remove the substance to be recovered by tangential flow filtration, for example a protein, as permeate.

In particular, tangential flow filtration can be used in combination with bioreactors, both in continuous processes and in batch processes, for example in processes for culturing cells or other biological material. For example, perfusion processes with bioreactors are known that are used for the continuous cultivation of cells, whereby, for example, metabolic products of the cells are separated out by tangential flow filtration and the cells are guided back to the bioreactor. For example, a nutrient solution for the cells can be continuously fed to the bioreactor, thereby replacing the mass or volume of the filtered-out components. In particular also for such applications in perfusion bioreactors, there is an increasing tendency to design components of the device as single-use parts in order to avoid or reduce to a minimum time-consuming sterilization processes.

It has been determined that one parameter that significantly influences the efficiency of tangential flow filtration is the pressure drop across the filter element, by which the permeate is moved through the filter element. A variable often used as a measure of this parameter is the transmembrane pressure (TMP), which is defined as the arithmetic mean of the pressure drop across the filter element. If the pressure of the fluid at the inlet of the filter element is designated by P1, the pressure at the outlet of the filter element by P2, and the pressure at the permeate opening by P3, the transmembrane pressure TMP is defined as:

$$TMP = (P1 + P2)/2 - P3$$

The transmembrane pressure is also designated as transmembrane pressure difference.

In order to increase the flow of permeate through the filter element, the flow resistance for the fluid downstream of the filter unit can be increased, whereby the pressure P2 at the outlet of the filter element is increased. Due to this, an increase of the transmembrane pressure TMP results, whereby the permeate flow is enlarged.

Usually, the flow resistance downstream of the filter unit and thus the pressure P2 at the outlet of the filter element is realized by a narrowing of the free flow cross-section for the fluid. This narrowing can be realized by using proportional or (tube) pinch valves. However, it has been determined that this technology has considerable disadvantages.

Since the relationship between the position of the pinch valve and the transmembrane pressure is highly non-linear, even at a constant delivery of the conveying pump, a desired transmembrane pressure can only be adjusted by lengthy adjustment of the pinch valve. In addition, there is only a very narrow range for the adjustment of the pinch valve in which an at least approximate adjustment of the desired transmembrane pressure is at all reliably possible. In the case of conventional pinch valves, for example, this range can correspond to a stroke of the pinch device of significantly less than one millimeter.

Due to the narrowing of the flow cross-section in the pinch valve, very high shear forces can be generated, which can have a damaging influence on the fluid, e.g., on particles, cells, or macromolecules such as proteins contained in a suspension. Thus, undesirable degradation can occur in the fluid or in components of the fluid. These high shear forces are also caused in particular by the high flow velocities resulting from the reduction of the flow cross-section.

A further disadvantageous effect is that, due to the deformation of the tube in the pinch valve, particles are released from the tube, which then contaminate the fluid. This is also a significant risk, in particular in biotechnological or pharmaceutical applications.

Starting from this state of the art, this disclosure provides an improved device and a method for tangential flow filtration of a fluid, in which the transmembrane pressure and/or the tangential flow can be reliably adjusted in a simple manner with very high accuracy and over as large an operating range as possible.

This advantageous subject matter are characterized by the features disclosed herein.

According to the disclosure, a device for tangential flow filtration of a fluid is thus proposed, comprising a filter unit which has a first fluid opening and a second fluid opening for the fluid, as well as a filter element and a permeate opening for discharging a permeate filtered out of the fluid, wherein the device further comprises a first flow connection by which the first fluid opening can be connected to a reservoir for the fluid, and a second flow connection by which the second fluid opening can be connected to the reservoir for the fluid, wherein a first centrifugal pump is disposed in the first flow connection, with which the fluid can be conveyed from the reservoir to the filter unit, wherein a first control unit is capable of actuating the first centrifugal pump, and wherein the filter unit is designed in such a way that the fluid for tangential flow filtration in the filter unit can flow substantially parallel to the filter element. A second centrifugal pump for the fluid is disposed in the second flow connection, by which a counter-pressure can be generated at the second fluid opening, wherein a second control unit is capable of actuating the second centrifugal pump.

Thus, in addition to the first centrifugal pump, with a primary function of conveying the fluid through the filter unit or to circulate the fluid, a second centrifugal pump is disposed in the second flow connection, which is connected to the second fluid opening of the filter unit. This second centrifugal pump operates in the opposite direction to the first centrifugal pump and can thus generate a counter-pressure at the second fluid opening, so that the pressure at the second fluid opening is increased. In this way, the pressure drop across the filter element is increased, whereby the permeate flow can be increased. It is particularly advantageous that no pinching of the second flow connection is required to increase the pressure at the second fluid opening, and that the free flow cross-section in the second flow connection also does not have to be changed by other measures. In this way, the high non-linearities of the devices known from the state of the art can be avoided. The pressure of the fluid at the second fluid opening can be adjusted by the second centrifugal pump with high accuracy, in a simple manner, reproducibly and reliably over a large operating range.

Due to the fact that measures to reduce the flow cross-section in the second flow connection can be dispensed with according to this disclosure, i.e., for example by dispensing with the pinching of a tube connection, the associated greatly increased flow velocities can also be avoided, as a result of which the shear forces acting on the fluid or its components are very low. This is very advantageous, in particular with regard to the gentlest possible treatment of the fluid or its components. A particular advantage of the device according to the disclosure is therefore that the device can be designed free of pinch valves or other elements for reducing the flow cross-section, in particular in the second flow connection.

In addition, strong mechanical deformations in the second flow connection can be avoided by the solution according to this disclosure, as are unavoidable when using pinch valves, for example. In this way, it can be prevented in particular that particles escape from the second flow connection, for example a tube connection, and contaminate the fluid.

According to a preferred embodiment, the device comprises a flow sensor for determining the flow rate of the fluid through the first flow connection, wherein the first control unit is designed in such a way that it can adjust a desired value for the flow rate via an operating parameter of the first centrifugal pump, in particular the rotational speed. In this embodiment, the first centrifugal pump is thus used to adjust or regulate a predeterminable desired value for the flow of the fluid through the first flow connection.

Furthermore, it is preferred that a plurality of pressure sensors is provided, which are arranged in such a way that a transmembrane pressure can be determined with the pressure sensors via the filter element, wherein the second control unit is designed in such a way that it can adjust a desired value for the transmembrane pressure via an operating parameter of the second centrifugal pump, in particular the rotational speed. In this embodiment, the transmembrane pressure is thus adjusted or regulated to a desired value by the second centrifugal pump.

Preferably, the plurality of pressure sensors comprises a first pressure sensor with which a first pressure of the fluid at the first fluid opening can be determined, and a second pressure sensor with which a second pressure of the fluid at the second fluid opening can be determined, and a third pressure sensor with which a third pressure at the permeate opening can be determined. In this way, the actual value of the transmembrane pressure can be determined in a very simple and accurate way.

According to an also preferred embodiment, a central control unit is provided which is signal-connected to the first control unit and to the second control unit, wherein the central control unit is designed for actuating the first control unit and the second control unit. In addition to an actuation of the first and second centrifugal pumps independently of each another, it is therefore also possible to provide the central control unit, which actuates the first and second control units for the first and second centrifugal pumps, respectively in a coordinated manner. One advantage of the embodiment with a central control unit is that the quadratic terms can be eliminated in the actuation or the regulation, which for a single centrifugal pump result from the fact that the pressure, or more precisely the delivery head, is proportional to the square of the rotational speed of the centrifugal pump.

Particularly preferably, the second centrifugal pump comprises a rotor for conveying the fluid, and a stator which forms with the rotor an electromagnetic rotary drive for rotating the rotor about an axial direction, wherein the rotor comprises a magnetically effective core, and a plurality of vanes for conveying the fluid, wherein the stator is a bearing and drive stator with which the rotor can be magnetically driven without contact and can be magnetically levitated without contact with respect to the stator. This embodiment of the centrifugal pump with a magnetically levitated rotor, which is simultaneously the pump rotor of the centrifugal pump and the rotor of the electromagnetic rotary drive for driving the rotation, enables an extremely compact, space-saving and powerful design of the second centrifugal pump. Due to the contactless magnetic levitation of the rotor, no mechanical bearings are therefore required, which could lead to contamination of the fluid by abrasion, for example. The contactless magnetic levitation of the rotor also enables extremely precise and simple adjustment of the pressure generated by the second centrifugal pump, for example via the rotational speed of the rotor.

As an alternative, but preferably complementarily, the first centrifugal pump comprises a rotor for conveying the fluid, and a stator which forms with the rotor an electromagnetic rotary drive for rotating the rotor about an axial direction, wherein the rotor comprises a magnetically effective core, and a plurality of vanes for conveying the fluid, wherein the stator is designed as a bearing and drive stator with which the rotor can be magnetically driven without contact and can be magnetically levitated without contact with respect to the stator.

It is therefore possible to design only the first centrifugal pump with a rotor that can be magnetically driven without contact and can be magnetically levitated without contact with respect to the stator, or to design only the second centrifugal pump with a rotor that can be magnetically driven without contact and can be magnetically levitated without contact with respect to the stator. Preferably, both the first and second centrifugal pumps are each designed with a rotor that can be magnetically driven without contact and magnetically levitated without contact with respect to the stator.

With regard to the magnetic levitation of the rotor, it is particularly preferred that each rotor is in each case actively magnetically levitated in a radial plane perpendicular to the axial direction and is passively magnetically stabilized in the axial direction and against tilting.

A particularly preferred embodiment is the embodiment as a temple motor, wherein each stator comprises a plurality of coil cores, each of which comprising a longitudinal limb extending in an axial direction and a transverse limb arranged in the radial plane and extending from the longitudinal limb in a radial direction, and wherein at least one concentrated winding is arranged on each longitudinal limb which surrounds the respective longitudinal limb. The embodiment as a temple motor is a particularly compact and simultaneously efficient embodiment.

According to a particularly preferred embodiment, each centrifugal pump comprises in each case a pump unit having a pump housing, wherein the pump housing comprises an inlet and an outlet for the fluid to be conveyed, wherein the rotor is arranged in the pump housing and comprises a plurality of vanes for conveying the fluid, and wherein the pump unit is designed in such a way that the pump unit can be inserted into the stator.

Preferably, the device according to an embodiment of the invention is designed in such a way that some components of the device, in particular those components which come into contact with the fluid, are designed as single-use parts which, according to the intended use, can only be used once and must be replaced after this use by new, i.e. unused, single-use parts.

For this reason, a set of single-use parts for a device according to an embodiment of the invention is further proposed, which set comprises at least the following components, each of which is designed as a single-use part:

the filter unit
one pump unit in each case for each centrifugal pump,
a plurality of tubes which is designed for realizing the first flow connection and the second flow connection,
and optionally a reservoir for the fluid or an insert for a reservoir.

It is understood that this list of components designed as single-use parts is not exhaustive. The set of single-use parts can also comprise other single-use parts, for example components of the pressure sensors.

Furthermore, a method for tangential flow filtration of a fluid is further proposed by an embodiment of the invention, in which method the fluid is supplied to a filter unit which has a first fluid opening and a second fluid opening for the fluid as well as a filter element and a permeate opening for discharging a permeate filtered out of the fluid, wherein the filter unit is designed in such a way that the fluid for tangential flow filtration in the filter unit is guided substantially parallel to the filter element, in which method the fluid is further conveyed by a first centrifugal pump from a reservoir through a first flow connection to the filter unit, wherein the fluid can be guided back into the reservoir from the second fluid opening through a second flow connection, and wherein the first centrifugal pump is actuated by a first control unit. A counter-pressure is generated at the second fluid opening with a second centrifugal pump, which is disposed in the second flow connection, wherein the second centrifugal pump is actuated by a second control unit.

The advantages of the method according to embodiments of the invention correspond in an analogous manner to those already explained in connection with the device according to embodiments of the invention.

Preferably, the flow rate of the fluid through the first flow connection is determined by a flow sensor, and a desired value for the flow rate is adjusted by the first control unit via an operating parameter of the first centrifugal pump, in particular the rotational speed.

It is also preferred that a first pressure at the first fluid opening is determined by a first pressure sensor, or a second pressure at the second fluid opening by a second pressure sensor, or a third pressure at the permeate opening by a third pressure sensor, wherein a desired value for the first pressure or for the second pressure or for the third pressure is adjusted by the second control unit via an operating parameter of the second centrifugal pump, in particular the rotational speed.

Furthermore, it is advantageous if a transmembrane pressure is determined by a plurality of pressure sensors via the filter element, and a desired value for the transmembrane pressure is adjusted by the first control unit or by the second control unit via an operating parameter of the first centrifugal pump or via an operating parameter of the second centrifugal pump, wherein the operating parameter is preferably the rotational speed of the first centrifugal pump or the second centrifugal pump.

A preferred variant is that tangential flow filtration is performed in an alternating mode comprising a first operating mode in which the fluid flows from the first fluid opening to the second fluid opening and a second operating mode in which the fluid flows from the second fluid opening to the first fluid opening. This means that the two centrifugal pumps are actuated such that the fluid to be filtered flows from the first centrifugal pump through the filter unit to the second centrifugal pump in the first operating mode and from the second centrifugal pump through the filter unit to the first centrifugal pump in the opposite direction in the second operating mode. This can be achieved in particular by actuating the two centrifugal pumps in the second operating mode in such a way that the counter-pressure generated by the second centrifugal pump at the second fluid opening is greater than the pressure generated by the first pump at the first fluid inlet of the filter unit.

The flow direction in the two operating modes is determined in each case by the differential pressure of the pressures generated by the two centrifugal pumps.

An advantage of this operation in alternating mode is that the filter element is alternately overflowed in opposite directions, whereby deposits on the filter element or the build-up of an undesired filter cake on the filter element can be avoided more efficiently for many applications.

In alternating mode, changing between the first operating mode and the second operating mode is preferably performed according to a predeterminable time scheme.

It is possible to perform the first operating mode and the second operating mode in a 50% to 50% ratio, but of course other ratios such as 75% to 25% are also possible. The selection of a suitable ratio can be selected depending on the respective application or can be optimized for the respective application.

The frequency of changing between the first and the second operating mode can also be adjusted as desired. Furthermore, for each operating mode, the respective flow rate or one of the three pressures, namely the pressure at the first fluid opening, the pressure at the second fluid opening or the pressure at the permeate opening, and thus also the transmembrane pressure can be adjusted as desired.

Further advantageous measures and embodiments of the invention result from the disclosure herein.

BRIEF DESCRIPTION OF THE DRAWINGS

The invention will be explained in more detail hereinafter with reference to the drawings.

FIG. 7 illustrates an embodiment of a centrifugal pump having a rotor which can be magnetically levitated without contact in a section in the axial direction.

DETAILED DESCRIPTION

Figure 1:
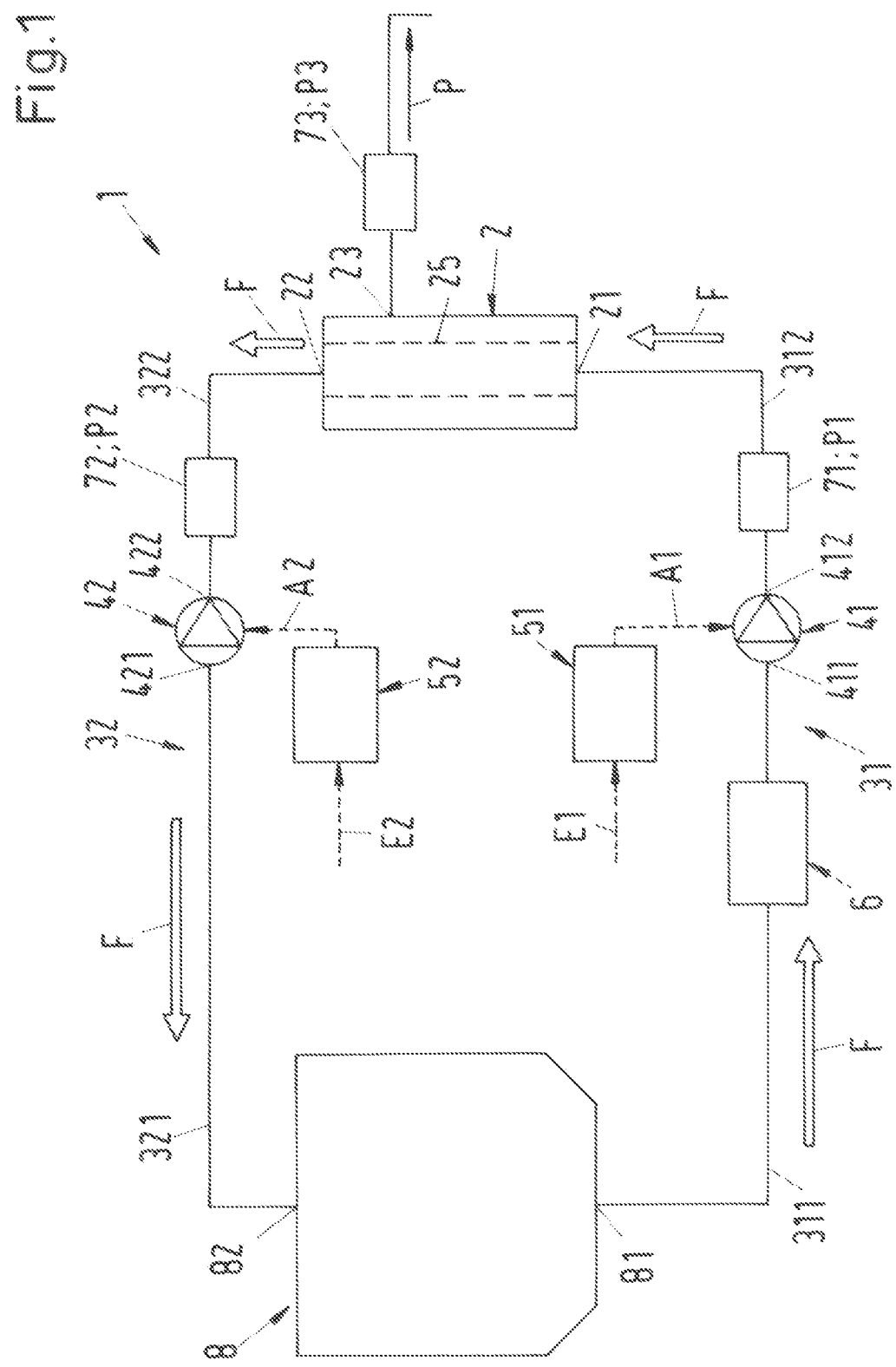
FIG. 1 illustrates a schematic representation of a first embodiment of a device according to the invention for tangential flow filtration.

FIG. 1 shows in a schematic representation a first embodiment of a device according to the invention for tangential flow filtration of a fluid, which is designated as a whole with the reference sign 1. The fluid is, for example, a suspension from which at least one component is to be filtered out. Here, it is possible that the component to be filtered out, which is discharged as permeate, is the target product, which is to be recovered during filtration, for example a protein, or that by filtering out the permeate the fluid remaining as retentate is the target product, which is to be concentrated by filtration, so that, for example, the concentration of one or more components of the fluid increases.

The device 1 for tangential flow filtration comprises a filter unit 2 in which a filter element 25 is arranged, a first flow connection 31, with which the filter unit 2 can be connected to a reservoir 8 for the fluid, and a second flow connection 32, with which the filter unit 2 can be connected to the reservoir 8.

For example, the reservoir 8 can also be a bioreactor for a perfusion process for the continuous cultivation of cells, whereby the filter unit 2 is used to filter out metabolic products of the cells or to obtain cell-free media, and the cells, or the suspension containing the cells, are subsequently returned to the bioreactor.

A first centrifugal pump 41 for the fluid is arranged in the first flow connection 31, which has an inlet 411 and an outlet 412 for the fluid. Furthermore, a first control unit (controller) 51 can actuate the first centrifugal pump 41. Preferably, the first control unit 51 comprises a regulating device with which the operation of the first centrifugal pump 41 can be regulated.

A second centrifugal pump 42 for the fluid is arranged in the second flow connection 32, which has an inlet 421 and an outlet 422 for the fluid. Furthermore, a second control unit (controller) 52 can actuate the second centrifugal pump 42. Preferably, the second control unit 52 comprises a regulating device with which the operation of the second centrifugal pump 42 can be regulated.

The second centrifugal pump 42 is arranged in such a way and is operated in such a way that it operates in the opposite direction to the first centrifugal pump 41. This means that the outlet 412 of the first centrifugal pump 41 is connected to the outlet 422 of the second centrifugal pump 42 via the filter unit 2. Both the outlet 412 of the first centrifugal pump 41 and the outlet 422 of the second centrifugal pump 42 are each connected to the filter unit 2.

The flow of the fluid, and in particular the direction of the flow, is represented in FIG. 1 by the arrows with the reference sign F.

The filter unit 2 comprises a first fluid opening 21 and a second fluid opening 22 for the fluid, as well as a permeate opening 23 for discharging the permeate filtered out of the fluid, which is indicated in FIG. 1 by the arrow with reference sign P.

In the direction of the flow F represented in FIG. 1, the first fluid opening 21 serves as the inlet of the filter unit 2 through which the fluid flows into the filter unit 2, and the second fluid opening 22 serves as the outlet through which the retentate flows out of the filter unit 2.

The filter unit 2 is designed for a tangential flow filtration, which is also designated as cross-flow filtration. This means that the fluid in the filter unit 2 is guided parallel to the filter element 25, so that the fluid flows over the filter element 25, and the filtering out of the permeate takes place perpendicular to the flow direction of the fluid.

Such filter units 2, which are designed for tangential flow filtration, are sufficiently known to the person skilled in the art from the state of the art and therefore require no further explanation.

A substantial variable in tangential flow filtration is the pressure difference across the filter element 25, which drives the filtering out of the permeate. As is common practice, this pressure difference across the filter element 25 is also characterized by a so-called transmembrane pressure (TMP) in the framework of this application. The transmembrane pressure (TMP) is a mathematical variable which indicates the arithmetic mean of the pressure drop across the filter element 25.

The pressure of the fluid at the first fluid opening 21 is designated as a first pressure P1. The pressure of the fluid at the second fluid opening 22 is designated as a second pressure P2. The pressure of the fluid at the permeate opening 23 is designated as a third pressure P3. The transmembrane pressure TMP is then defined as:

$$TMP=(P1+P2)/2-P3$$

Transmembrane pressure is also designated as transmembrane pressure difference.

The first flow connection 31 and the second flow connection 32 are preferably realized with pipes that are designed as flexible pipes, i.e., pipes whose walls can be deformed. Each pipe is designed, for example, as a tube, in particular as a plastic tube, made for example of a silicone rubber, PVC (polyvinyl chloride), (polyurethane), PE (polyethylene), HDPE (high density polyethylene), PP (polypropylene), EVA (ethyl vinyl acetate) or nylon. Preferably, each tube which belongs to the first flow connection 31 or the second flow connection 32 is designed for single use. When designed for single use, those components which come into contact with the substances to be treated, i.e., in this case in particular the tubes, are only used exactly once and are then replaced by new, i.e., unused, single-use parts during the next application.

The first flow connection 31 comprises a supply tube 311 which connects a first opening 81 of the reservoir 8 to the inlet 411 of the first centrifugal pump 41, and a feeding tube 312 which connects the outlet 412 of the first centrifugal pump 41 to the first fluid opening 21 of the filter unit 2.

Furthermore, a flow sensor 6 can determine the flow rate of the fluid through the first flow connection 31. For example, the flow sensor 6 is provided in or on the supply tube 311 of the first flow connection 31, i.e., between the reservoir 8 and the first centrifugal pump 41. In particular, the flow sensor 6 can be designed as a so-called clamp-on sensor, i.e., as a flow sensor 6 that is clamped onto the supply tube 311 so that the supply tube 311 is clamped in the measuring range of the flow sensor 6.

The second flow connection 32 comprises a discharge tube 322 which connects the second fluid opening 22 of the filter unit 2 to the outlet 422 of the second centrifugal pump 42, and a return tube 321 which connects the inlet 421 of the second centrifugal pump 42 to a second opening 82 of the reservoir 8.

In this way, both the outlet 412 of the first centrifugal pump 41 and the outlet 422 of the second centrifugal pump 42 are connected in each case to the filter unit 2, namely the outlet 412 of the first centrifugal pump 41 to the first fluid opening 21 and the outlet 422 of the second centrifugal pump 42 to the second fluid opening 22 of the filter unit 2. For this reason, the second centrifugal pump 42 can generate a counter-pressure at the second fluid opening 22 so that the second pressure P2 can be adjusted at the second fluid opening 22.

In the operating state, the first centrifugal pump 41 serves to move the fluid through the filter unit 2 and via the filter element 25. The first centrifugal pump 41 circulates the fluid from the reservoir 8 through the first flow connection 31, through the filter unit 2, and through the second flow connection 32 back into the reservoir 8.

In the operating state, the second centrifugal pump 42 serves to generate a counter-pressure at the second fluid opening 22 of the filter unit 2, i.e., the second centrifugal pump 42 is operated in such a way that it increases the second pressure P2 prevailing at the second fluid opening 22 of the filter unit 2.

Preferably, the device 1 further comprises a plurality of pressure sensors 71, 72, 73, wherein the pressure sensors 71, 72, and 73 are arranged and designed in such a way that they can be used to determine the TMP via the filter element 25.

In the embodiment represented in FIG. 1, a total of three pressure sensors 71 are provided, namely a first pressure sensor 71 with which the first pressure P1 of the fluid at the first fluid opening 21 can be determined, a second pressure sensor 72 with which the second pressure P2 of the fluid at the second fluid opening 22 can be determined, and a third pressure sensor 73 with which the third pressure P3 at the permeate opening 23 can be determined.

It is understood that embodiments of the device 1 according to the invention are also possible in which only one of the pressure sensors 71, 72, 73 is provided, for example only the first pressure sensor 71 or only the second pressure sensor 72 or only the third pressure sensor 73. Furthermore, embodiments are also possible in which exactly two pressure sensors are provided, i.e., only the first pressure sensor 71 and the second pressure sensor 72, or only the first pressure sensor 71 and the third pressure sensor 73, or only the second pressure sensor 72 and the third pressure sensor 73.

The number of pressure sensors 71, 72, 73 and which pressure sensors 71, 72, 73 are provided depends in particular on the specific design of the regulating device or control system with which the method according to the invention is performed.

In the first embodiment represented in FIG. 1, the first pressure sensor 71 is disposed between the first centrifugal pump 41 and the filter unit 2, namely in or on the feeding tube 312. The second pressure sensor 72 is disposed between the filter unit 2 and the second centrifugal pump 42, namely in or on the discharge tube 322. The third pressure sensor 73 is arranged at or downstream of the permeate opening 23.

The method according to embodiments of the invention is preferably performed with the device 1 in such a way that one of the two centrifugal pumps 41 or 42 is used for adjusting or regulating a desired value for the flow rate, while the other of the two centrifugal pumps 42 or 41 is used for adjusting or regulating the transmembrane pressure (TMP) to a desired value for the TMP.

Thereby, it is preferred for the adjusting of the desired values for the flow rate and for the TMP that the respective adjusting is performed by the first control unit 51 or by the second control unit 52 via an operating parameter of the first centrifugal pump 41 or the second centrifugal pump 42, respectively. Particularly preferably, the respective operating parameter is the rotational speed of the first centrifugal pump 41 or the second centrifugal pump 42.

In the following, some variants for the operation of the device 1 are described. A common feature of these variants is that the first control unit 51 is used for flow control, i.e., for regulating the flow of the fluid through the first flow connection 31 to a desired value for the flow rate. The second control unit 52 is used for pressure regulation, i.e., for regulating the transmembrane pressure (TMP) to a desired value for the TMP or for regulating the first pressure P1 or the second pressure P2 or the third pressure P3 to a respective desired value. The second control unit 52 is thus used for pressure regulation.

The two control units 51 and 52 can each be designed as an autarkic control unit 51, 52. It is not necessary, but possible, that the control units 51 and 52 exchange signals or information with each other.

The first control unit 51 receives a first input variable E1, which can comprise one or more measurement signal(s) or actual value(s) and/or desired value(s) and determines by the first input variable E1 a first output variable A1, with which the first centrifugal pump 41 is actuated to regulate or maintain the desired value for the flow rate. The first output variable A1 comprises in particular information with which the rotational speed of the first centrifugal pump 41 can be adjusted, or a value for the rotational speed of the first centrifugal pump 41.

The second control unit 52 receives a second input variable E2, which can comprise one or more measurement signal(s) or actual value(s) and/or desired value(s) and determines by the second input variable E2 a second output variable A2, with which the second centrifugal pump 42 is actuated to regulate or maintain the desired value for the TMP or for the first pressure P1 or for the second pressure P2 or for the third pressure P3. The second output variable A2 comprises, in particular, information with which the rotational speed of the second centrifugal pump 52 can be adjusted, or a value for the rotational speed of the second centrifugal pump 42.

According to a first variant, the first input variable E1 comprises the desired value for the flow rate and the actual value for the flow rate, which is determined with the aid of the flow sensor 6. The rotational speed of the first centrifugal pump 41 is changed with the first output variable A1 such that the actual value for the flow rate is regulated to the desired value for the flow rate. The second input variable E2 comprises the actual values for the first pressure P1, the second pressure P2 and the third pressure P3 as well as the desired value for the TMP. The rotational speed of the second centrifugal pump 42 is changed with the second output variable A2 such that the actual value for the TMP is regulated to the desired value for the TMP. The actual value of the TMP can be determined, for example, from the three pressures P1, P2, P3.

According to a further variant, the first input variable E1 comprises the desired value for the flow rate and the actual value for the flow rate, which is determined with the aid of the flow sensor 6. The rotational speed of the first centrifugal pump 41 is changed with the first output variable A1 such that the actual value for the flow rate is regulated to the desired value for the flow rate. The second input variable E2 comprises only an actual value for one of the pressures P1 or P2 or P3, i.e., either the actual value for the first pressure P1, or the actual value for the second pressure P2, or the actual value for the third pressure P3. The second input variable E2 further comprises the desired value for this pressure, i.e., either the desired value for the first pressure P1, or the desired value for the second pressure P2, or the desired value for the third pressure P3. The rotational speed of the second centrifugal pump 42 is changed with the second output variable A2 such that the actual value for the pressure P1 or P2 or P3 is regulated to the desired value for this pressure P1 or P2 or P3. In this variant, both the flow regulation in the first control unit 51 and the pressure regulation in the second control unit 52 are preferably each designed as proportional integral (PI) regulation.

Depending on the application, the method for tangential flow filtration can be performed as a batch process in which the fluid to be filtered, for example a suspension, is taken from the reservoir 8 by the first centrifugal pump 41 and is circulated through the first flow connection 31, through the filter unit 2 with the filter element 25 arranged therein, and through the second flow connection 32 back to the reservoir 8. The permeate, which passes through the filter element 25 in the filter unit 2 transversely to the flow direction, is discharged or removed through the permeate opening 23. Thereby, a counter-pressure is generated with the second centrifugal pump 42 to adjust the second pressure P2 at the second fluid opening 22. The first control unit 51 regulates the flow rate of the fluid to a desired value for the flow rate via the first centrifugal pump 41, preferably via the rotational speed of the first centrifugal pump 41. The second control unit 52 regulates a pressure, preferably the TMP or the first pressure P1 or the second pressure P2 or the third pressure P3 to a desired value for this pressure via the second centrifugal pump 42, preferably via the rotational speed of the second centrifugal pump 42.

However, it is also possible to perform the method for tangential flow filtration as a continuous method, for example in an application with a perfusion bioreactor for continuous removal of metabolic products.

According to a first variant for performing the method, the fluid is always circulated in the same direction through the device 1 during the entire filtration process, i.e., for example during the entire batch process or during the entire continuous process.

According to another variant for performing the method according to the invention, the tangential flow filtration is performed in an alternating mode. The alternating mode comprises a first operating mode in which the fluid flows from the first fluid opening 21 to the second fluid opening 22 through the filter unit 2, for example as described above, and a second operating mode in which the flow direction of the fluid is reversed so that the fluid flows from the second fluid opening 22 to the first fluid opening 21 of the filter unit 2 in the second operating mode.

Figure 2:
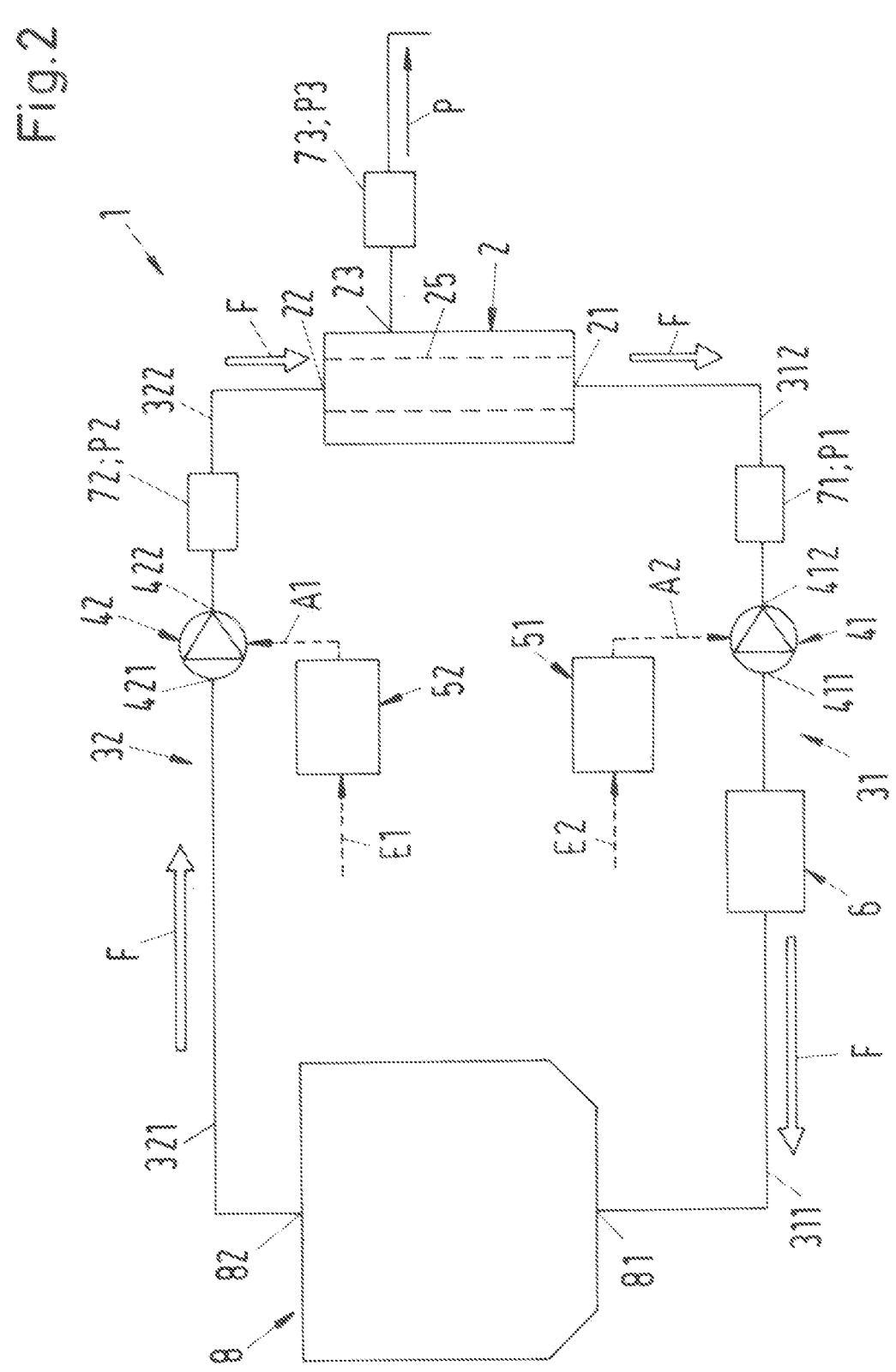
FIG. 2 illustrates a schematic representation of the first embodiment in a second operation mode.

In FIG. 2, the second operating mode is illustrated in a schematic representation of the first embodiment of the device 1, wherein FIG. 2 otherwise corresponds to FIG. 1.

The change from the first operating mode to the second operating mode can be realized in a simple way by actuating the two centrifugal pumps 41, 42. For example, in the second operating mode, the two centrifugal pumps 41, 42 are thus actuated such that the counter-pressure generated by the second centrifugal pump 42 is so great that the second pressure P2 at the second fluid opening 22 of the filter unit 2 is greater than the first pressure P1 generated by the first centrifugal pump 41 at the first fluid inlet 21 of the filter unit 2.

In the second operating mode, the functions of the first control device 51 and the second control device 52 are preferably interchanged compared to the first operating mode. In the second operating mode, the second control unit 52 is thus preferably used for flow regulation, i.e., for regulating the flow rate of the fluid to a desired value for the flow rate. The first control unit 51 is used for pressure regulation, i.e., for regulating the transmembrane pressure (TMP) to a desired value for the TMP or for regulating the first pressure P1 or the second pressure P2 or the third pressure P3 to a respective desired value. Now, the first control unit 51 is thus used for a pressure regulation.

Accordingly, in the second operating mode, the second control unit 52 receives the first input variable E1, which can comprise one or more measurement signal(s) or actual value(s) and/or desired value(s) as described above and determines the first output variable A1 with the aid of the first input variable E1, with which the second centrifugal pump 42 is actuated in order to regulate or maintain the desired value for the flow rate.

The first control unit 51 receives the second input variable E2, which can comprise one or more measurement signal(s) or actual value(s) and/or desired value(s) as described above, and determines the second output variable A2 with the aid of the second input variable E2, with which the first centrifugal pump 41 is actuated in order to regulate or maintain the desired value for the TMP or for the first pressure P1 or for the second pressure P2 or for the third pressure P3.

Performing the method for tangential flow filtration in alternating mode has the advantage that the filter element 25 is alternately overflowed in opposite directions, whereby deposits on the filter element 25 or the buildup of an undesired filter cake on the filter element 25 can be avoided more efficiently for many applications. It is also possible to remove again—at least partially—deposits that have already formed on or in the filter element 25 by reversing the flow direction.

Due to this measure of reversing the flow direction, clogging or partial clogging of the filter element 25 can also be prevented or at least reduced, thus maintaining the permeability of the filter element and thus increasing the yield of permeate, for example compared to operation with only one flow direction. Furthermore, it is possible to use the filter unit 2 or the filter element 25 for a longer period of time compared to operation with only one flow direction.

In alternating mode, changing between the first operating mode and the second operating mode is preferably performed according to a predeterminable time scheme.

The differential pressure of the two pressures generated by the first centrifugal pump 41 and the second centrifugal pump 42, and thus the difference between the first pressure P1 and the second pressure P2, which after all determines the flow direction of the fluid through the filter unit 2, can be adjusted independently for each operating mode. In particular, a different value for the difference between the first pressure P1 and the second pressure P2 can also be adjusted in terms of amount for operation in the first operating mode than in the second operating mode. Furthermore, it is possible, for example, to adjust or regulate a different transmembrane pressure (TMP) in the first operating mode than in the second operating mode. It is also possible to adjust or regulate a different flow rate of the fluid in the first operating mode than in the second operating mode.

The number of changes or the frequency of changes between the first operating mode and the second operating mode is also freely adjustable and can be optimized for the respective application.

The percentage of the first operating mode or the second operating mode in the whole process of tangential flow filtration can also be freely selected. For example, it is possible to perform the first operating mode and the second operating mode in a ratio of 50% to 50%, i.e., with equal proportions, but of course other ratios such as 75% to 25% or even 99% to 1% are also possible. The selection of a suitable ratio can be selected depending on the respective application or can be optimized for the respective application.

Figure 3:
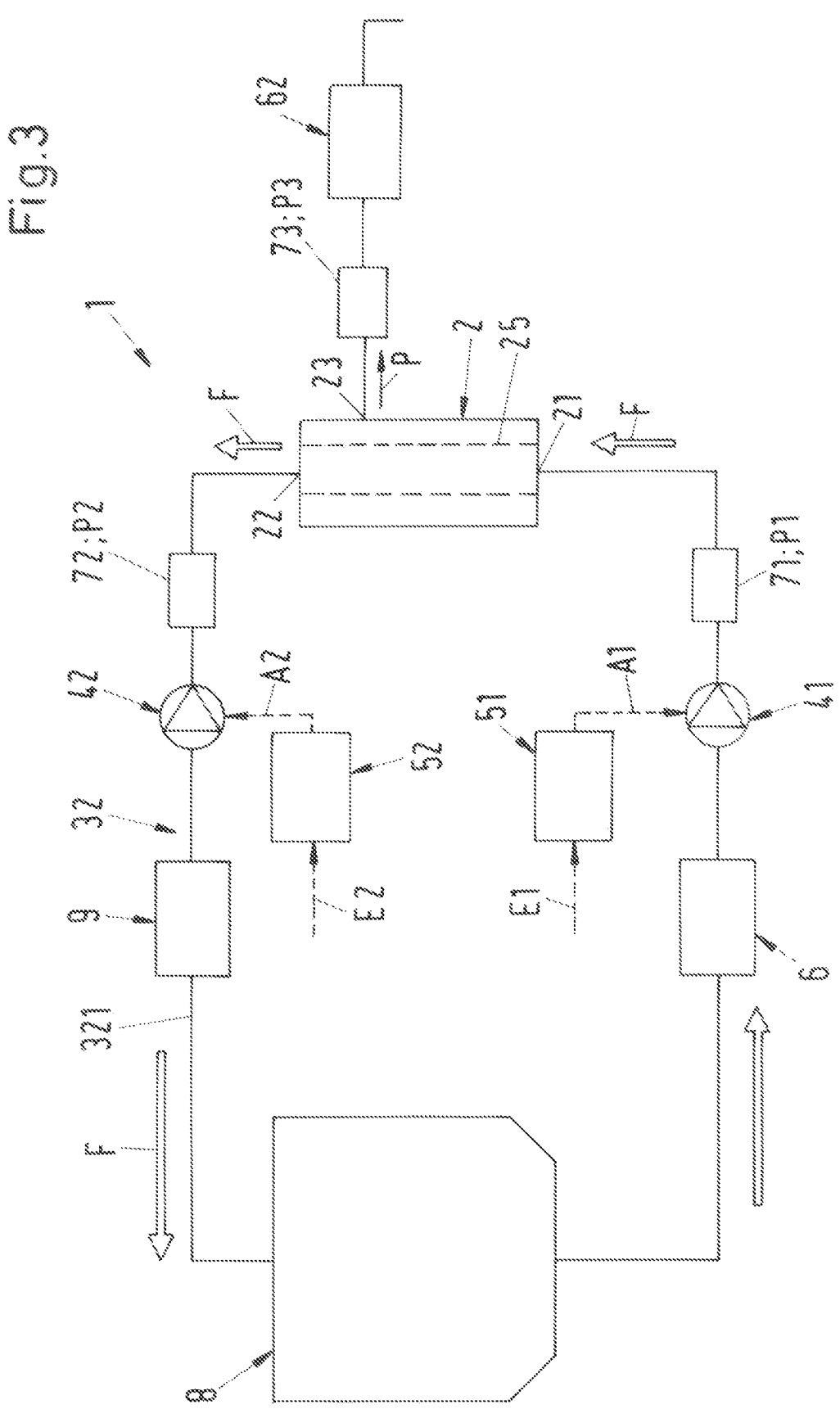
FIG. 3 illustrates a variant for the first embodiment.

In a representation analogous to FIG. 1, FIG. 3 shows a variant for the first embodiment of the device according to the invention.

In this variant of the device 1, a viscosity sensor 9 is further provided, which is arranged in the second flow connection 32, for example, and with which the viscosity of the fluid can be determined. Preferably, the viscosity sensor 9 is designed for inline measurement of the viscosity of the fluid. The viscosity sensor is preferably arranged in or on the return tube 321 of the second flow connection 32. For example, by the viscosity sensor 9, the progress of the concentration of the fluid can be determined, in particular in such applications where the filtering out of the permeate from the fluid leads to a change in the viscosity of the fluid.

Furthermore, in the variant represented in FIG. 3, a second flow sensor 62 is also provided, which is arranged downstream of the permeate opening 23 and, for example, also downstream of the third pressure sensor 73. The flow of the permeate filtered out of the fluid by the filter element 25 can be determined with the second flow sensor 62 and thus, for example, the amount (amount of substance or volume or mass) of the permeate. From this, information about the efficiency of tangential flow filtration can be obtained.

In some embodiments, both the viscosity sensor 9 and the second flow sensor 62 are provided. In other embodiments, only one of the two elements, either only the viscosity sensor 9 or only the second flow sensor 62 is provided.

Furthermore, it is possible, to determine the protein concentration by an inline refractometer or an inline photo-spectrometer, for example, instead of using a viscosity sensor. However, since such instruments are very expensive, it is important that these devices are reusable without the need to clean and sterilize them before each use. For example, this can be achieved by inserting a part made of transparent plastic, for example polycarbonate, into the respective tube, through which the light of the refractometer or the photo-spectrometer can be guided. Here, it is advantageous that the inserted part is not round but is designed with flat walls, for example rectangular, hexagonal or octagonal.

Figure 4:
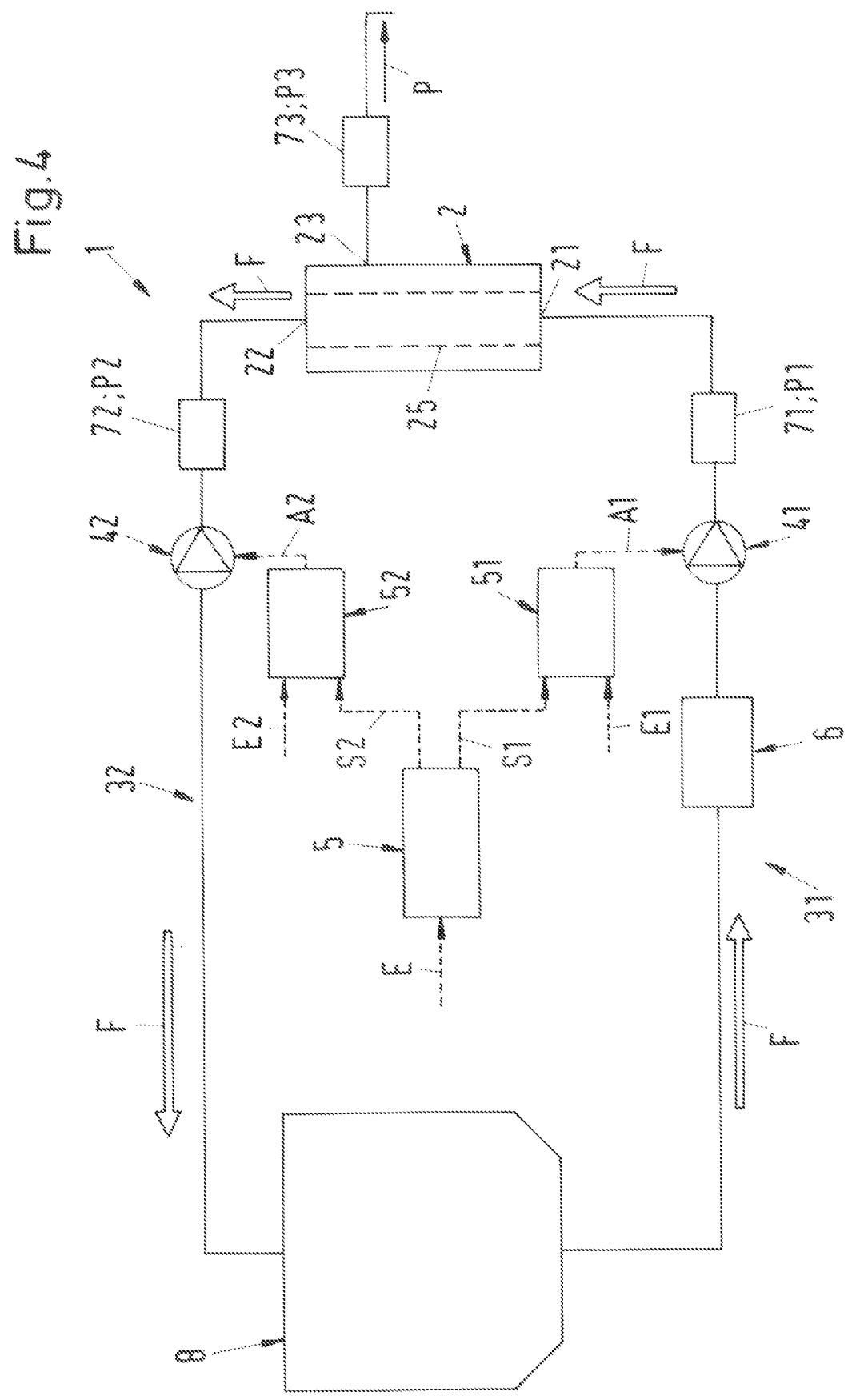
FIG. 4 illustrates a schematic representation of a second embodiment of a device according to the invention for tangential flow filtration.
Figure 5:
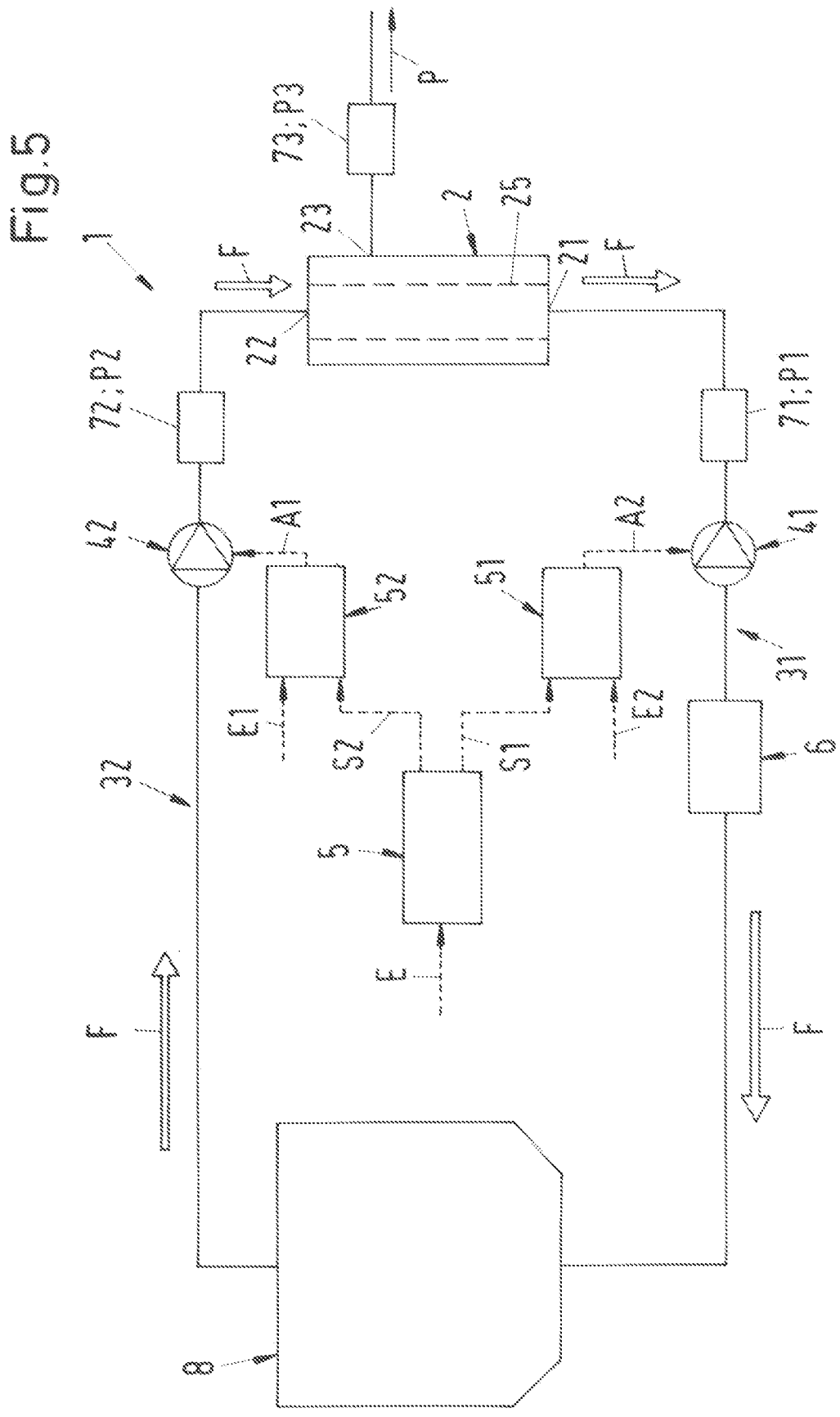
FIG. 5 illustrates a schematic representation of the second embodiment in the second operation mode.

In FIG. 4 and FIG. 5, a second embodiment of a device 1 according to the invention for tangential flow filtration is shown in each case in a schematic representation, wherein FIG. 4 shows the second embodiment in the first operating mode and FIG. 5 in the second operating mode.

In the following description of the second embodiment, only the differences from the first embodiment will be discussed in more detail. The same parts or parts equivalent in function of the second embodiment are designated with the same reference signs as in the first embodiment or its variants. In particular, the reference signs have the same meaning as already explained in connection with the first embodiment. It is understood that all the preceding explanations of the first embodiment and its variants also apply in the same way or in an analogously same way to the second embodiment.

In the second embodiment, the device 1 additionally comprises a central control unit (central controller) 5 which is signal-connected to the first control unit 51 and to the second control unit 52, wherein the central control unit 5 is designed for actuating the first control unit 51 and the second control unit 52.

The second embodiment of the device 1 is particularly advantageous for the embodiment of the method in which the tangential flow filtration is performed in the alternating mode. Of course, the second embodiment of the device 1 is not limited to the use in tangential flow filtration in alternating mode but can also be used for such embodiments of the method according to the invention in which no reversal of the flow direction takes place during tangential flow filtration.

In the embodiment represented in FIG. 4 and FIG. 5, the second embodiment of the device 1 is designed in particular for operation in alternating mode.

The central control unit 5 receives an input variable E, which comprises in particular several desired values. The input variable E for the central control unit 5 comprises, for example, one or more of the following desired values: the desired value for the first pressure P1 the desired value for the second pressure P2, the desired value for the third pressure P3, the desired value for the transmembrane pressure TMP, the desired value for the flow rate of the fluid, the desired value for the frequency of the change between the first operating mode and the second operating mode, the desired value for the relative duty cycle of the first or the second operating mode, i.e. the percentage share of the first or the second operating mode in the tangential flow filtration. It is understood that some desired values, e.g., the desired values for the pressures P1, P2, P2 or the TMP or the desired value for the flow rate can (but do not have to) have different values for the first operating mode than for the second operating mode.

The central control unit 5 generates a first control signal S1 from the input variable E to actuate the first control unit 51 and a second control signal S2 to actuate the second control unit 52. The first control signal S1 is transmitted to the first control unit 51 and the second control signal S2 is transmitted to the second control unit 52.

In the first operating mode, the first control unit 51 receives, in addition to the first control signal S1, the input variable E1, which comprises in particular one or more of the following actual values: the actual value for the flow rate of the fluid, the actual value for the first pressure P1, the actual value for the second pressure P2, the actual value for the third pressure P3. The first control unit 51 determines, by the first control signal S1 and by the first input variable E1, the first output variable A1 with which the first centrifugal pump 41 is actuated.

In the first operating mode, the second control unit 52 receives, in addition to the second control signal S2, the input variable E2, which comprises in particular one or more of the following actual values: the actual value for the flow rate of the fluid, the actual value for the first pressure P1, the actual value for the second pressure P2, the actual value for the third pressure P3. The second control unit 52 determines, by the second control signal S2 and by the second input variable E2, the second output variable A2 with which the second centrifugal pump 42 is actuated.

It is understood that in an analogously same way as in the first embodiment, the first control unit 51 can receive the input variable E2 in the second operating mode (FIG. 5) and the second control unit 52 can receive the input variable E1.

In the embodiment represented in FIG. 4 and FIG. 5, the information received by the first control unit 51 as input variable E1 is identical to the information received by the second control unit as input variable E2, so that for the alternating operating mode, the first control unit 51 and the second control unit 52 have all the information available to function as flow regulation or pressure regulation, depending on the desired flow direction of the fluid. On the basis of the control signals S1 or S2, the first control unit 51 or the second control unit 52 can recognize whether they are currently to operate as flow regulation or as pressure regulation, and when a change from the first operating mode to the second operating mode and vice versa is to take place. Due to the regulation of both centrifugal pumps 41, 42 it is possible to realize a pressure regulation and a flow regulation at the same time.

In principle, all types of centrifugal pumps with which the fluid can be moved through the filter unit 2 are suitable as the first centrifugal pump 41 and the second centrifugal pump 42.

In the following, on the basis of FIG. 6 and FIG. 7, a type of centrifugal pump is described which is especially preferred for the first centrifugal pump 41 or for the second centrifugal pump 42, and preferably for both the first and second centrifugal pumps 41 and 42.

Since preferably both the first centrifugal pump 41 and the second centrifugal pump 42 are designed according to the embodiment illustrated in FIG. 6 and FIG. 7, in the following description no further linguistic distinction is made between the first centrifugal pump 41 and the second centrifugal pump 42, but reference is made to the centrifugal pump 41, 42, wherein the explanations then apply in the same way to the first centrifugal pump 41 and to the second centrifugal pump 42.

Particularly preferably, but not necessarily, the first centrifugal pump 41 and the second centrifugal pump 42 are designed, at least substantially, identically.

The centrifugal pump 41, 42 described in the following comprises a rotor 30 for conveying the fluid, and a stator 20 which forms with the rotor 30 an electromagnetic rotary drive 10 for rotating the rotor 30 about an axial direction A, wherein the rotor 30 comprises a magnetically effective core 301, and a plurality of vanes 305 (FIG. 7) for conveying the fluid, wherein the stator 20 is designed as a bearing and drive stator with which the rotor 30 can be magnetically driven without contact and can be magnetically levitated without contact with respect to the stator 20.

A particular advantage of this embodiment of the centrifugal pump 41, 42 is that the rotor 30 is designed as an integral rotor, because it is both the rotor 30 of the electromagnetic rotary drive 10 and the rotor 30 of the centrifugal pump 41, 42, with which the fluid is conveyed. In total, the rotor 30 thus fulfills three functions in one: It is the rotor 30 of the electromagnetic drive 10, it is the rotor 30 of the magnetic levitation, and it is the impeller with which the fluid is acted upon. This embodiment as an integral rotor offers the advantage of a very compact and space-saving design.

A further advantage is the contactless magnetic, levitation of the rotor 30 with respect to the stator 20, which, due to the absence of mechanical bearings for the rotor 30, ensures that no contaminants, such as might occur in mechanical bearings, enter the fluid. In addition, due to the absence of mechanical bearings and the frictional forces occurring in them, the relationship between the electrical operating variables, such as drive current or drive voltage, and the rotational speed of the rotor 30 is much more precisely defined, which improves or simplifies the regulation of the centrifugal pump 41, 42.

Figure 6:
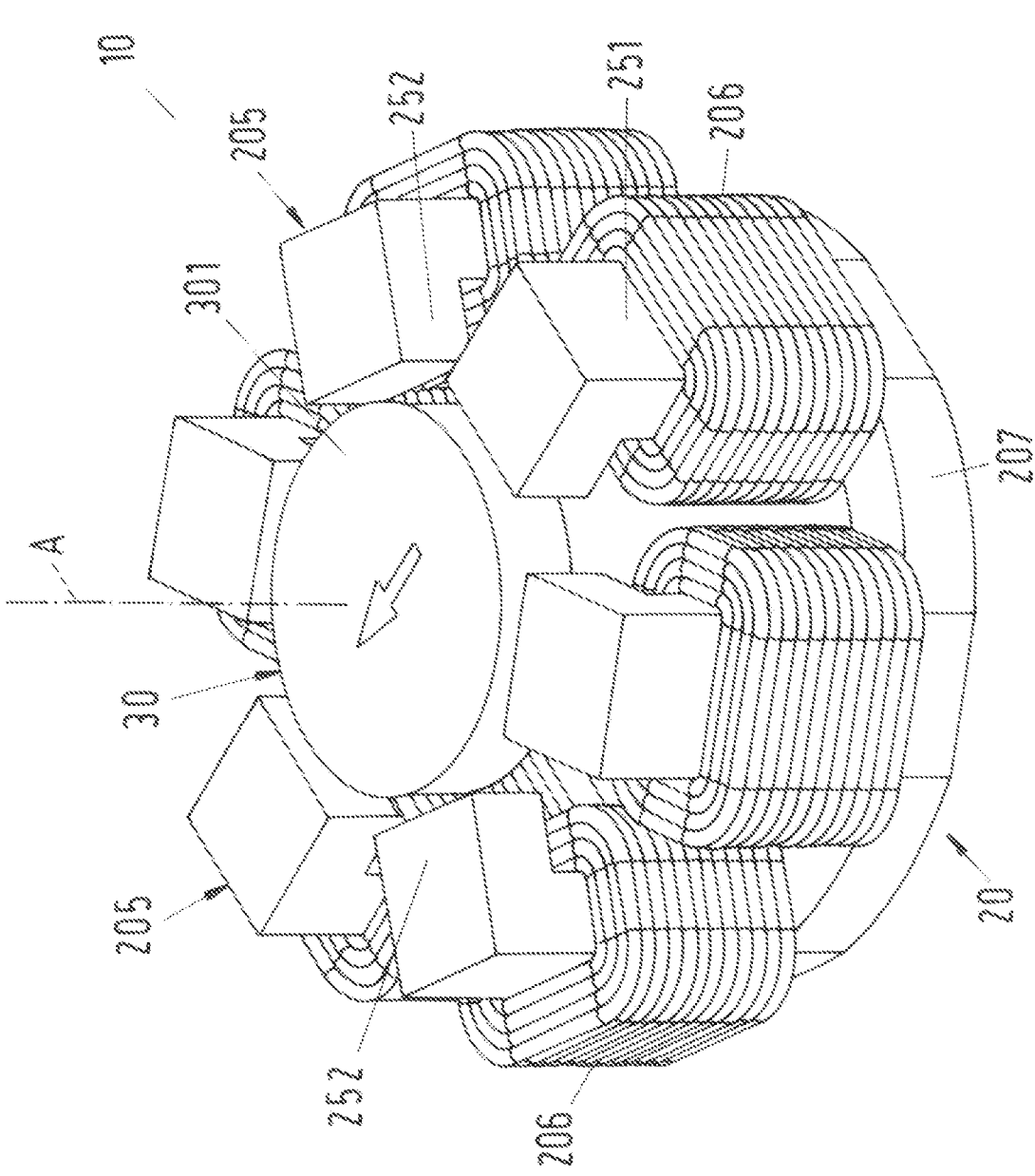
FIG. 6 illustrates a perspective representation of an electromagnetic rotary drive which is designed as a temple motor.

FIG. 6 shows a perspective representation of an embodiment of the electromagnetic rotary drive 10, which is designed as a so-called temple motor and according to the principle of the bearingless motor. FIG. 7 shows an embodiment of the centrifugal pump 41, 42 with the rotor 30, which can be magnetically levitated without contact in a section in the axial direction.

The electromagnetic rotary drive 10 is designed according to the principle of the bearingless motor and is operated according to this principle. The terra bearingless motor means an electromagnetic rotary drive 10 in which the rotor 30 is levitated completely magnetically with respect to the stator 20, wherein no separate magnetic bearings are provided. For this purpose, the stator 20 is designed as a bearing and drive stator, which is both the stator 20 of the electric drive and the stator of the magnetic levitation. The stator 20 comprises electrical windings 206, with which a magnetic rotating field can be generated, which on the one hand exerts a torque on the rotor 30, which effects its rotation about a desired axis of rotation defining an axial direction A, and which, on the other hand, exerts a shear force, which can be adjusted as desired, onto the rotor 30, so that its radial position can be actively controlled or regulated. Thus, three degrees of freedom of the rotor 30 can be actively regulated, namely its rotation and its radial position (two degrees of freedom). With respect to three further degrees of freedom, namely its position in the axial direction A and tilting with respect to the radial plane perpendicular to the desired axis of rotation (two degrees of freedom), the rotor 30 is preferably passively magnetically levitated or stabilized by reluctance forces, i.e. it cannot be controlled. The absence of a separate magnetic bearing with a complete magnetic levitation of the rotor 30 is the property, which gives the bearingless motor its name. In the bearing and drive stator, the bearing function cannot be separated from the drive function.

Figure 7:
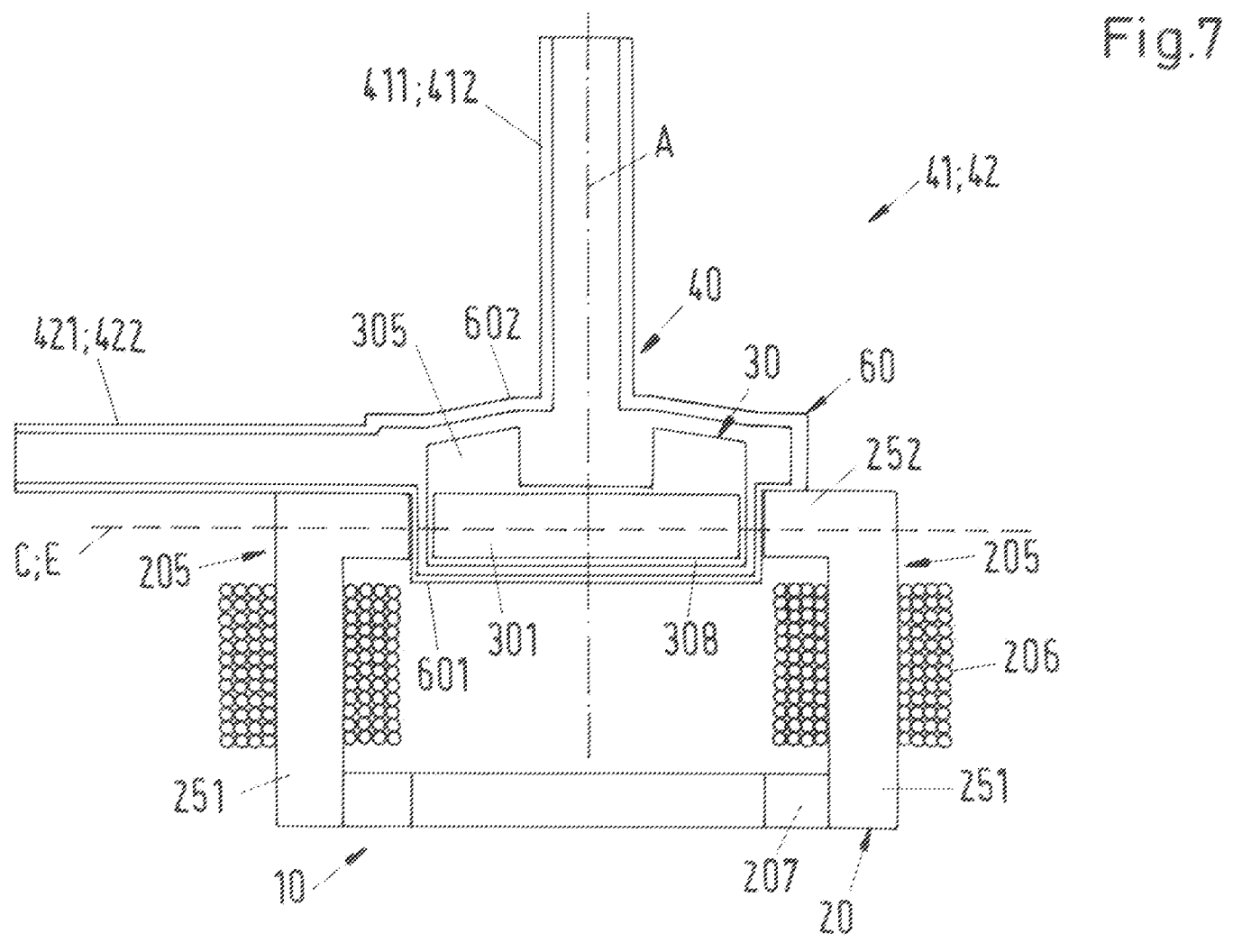

The desired axis of rotation refers to that axis about which the rotor 30 rotates in the operating state when the rotor 30 is in a centered and not tilted position with respect to the stator 20 as represented in FIG. 6 and FIG. 7. This desired axis of rotation defines the axial direction A. Usually, the desired axis of rotation defining the axial direction A corresponds to the central axis of the stator 20.

In the following, a radial direction refers to a direction, which stands perpendicular on the axial direction A.

The rotor 30 comprises the magnetically effective core 301, which is designed in a ring-shaped or disk-shaped manner. According to the representation in FIG. 6, the magnetically effective core 301 is designed as a permanent magnetic disk and defines a magnetic center plane C (FIG. 7). The magnetic center plane C of the magnetically effective core 301 of the rotor 30 refers to that plane perpendicular to the axial direction A in which the magnetically effective core 301 of the rotor 30 is levitated in the operating state when the rotor 30 is not tilted and not deflected in the axial direction A. As a rule, in a disk-shaped or ring-shaped magnetically effective core 301, the magnetic center plane C is the geometric center plane of the magnetically effective core 301 of the rotor 30, which is perpendicular to the axial direction A. That plane in which the magnetically effective core 301 of the rotor 30 is levitated in the stator 20 in the operating state is also referred to as the radial plane E. The radial plane defines the x-y plane of a Cartesian coordinate system whose z-axis extends in the axial direction A. If the magnetically effective core 301 of the rotor 30 is not tilted and not deflected with respect to the axial direction (A), the radial plane E coincides with the magnetic center plane C.

The radial position of the magnetically effective core 301 or the rotor 30 refers to the position of the rotor 30 in the radial plane E.

The "magnetically effective core 301" of the rotor 30 refers to that region of the rotor 30 which magnetically interacts with the stator 20 for torque generation and the generation of magnetic levitation forces.

The electromagnetic rotary drive 10 is designed as a temple motor and comprises the stator 20, which has a plurality of coil cores 205—here six coil cores 205—each of which comprises a longitudinal limb 251 extending in the axial direction A, and a transverse limb 252, which is arranged perpendicular to the longitudinal limb 251 and which extends in a radial direction and is bounded by an end face. The coil cores 205 are arranged equidistantly on a circular line so that the end faces of the transverse limbs 252 surround the magnetically effective core of the rotor 30 of. A concentrated winding 206 is arranged on each longitudinal limb 251, surrounding the respective longitudinal limb 252.

The longitudinal limbs 251 of the coil cores 205, which are aligned parallel to each other, and which all extend parallel to the axial direction A, and which surround the rotor 30 (or are surrounded by the rotor 30 in a design as an external rotor) are what gave the temple motor its name, because these parallel longitudinal limbs 251 are reminiscent of the columns of a temple.

In FIG. 6, only the magnetically effective core 301 of the rotor 30 is represented. Of course, it is understood that the rotor 30 can also comprise other components such as jackets or encapsulations, which are preferably made of a plastic, or of a metal, or of a metal alloy, or of a ceramic or ceramic material. Furthermore, the rotor 30 also comprises vanes 305 for pumping the fluid (see FIG. 7). The rotor 30 can also comprise other components.

Those ends of the longitudinal limbs 251 which face away from the transverse limbs 252—in FIG. 6 and FIG. 7 these are the lower ends according to the representation—are connected to each other by a return 207. The return 207 is preferably designed in a ring-shaped manner or comprises several segments that connect the longitudinal limbs 251 to one another. Both the return 207 and the coil Cores 205 of the stator 20 are each made of a soft magnetic material because they serve as flux conducting elements to guide the magnetic flux. Suitable soft magnetic materials for the coil cores 205 and the return 207 are, for example, ferromagnetic or ferrimagnetic materials, i.e., in particular iron, nickel-iron, cobalt-iron, silicon iron or Mu-metal. In this case, for the stator 20, a design as a stator sheet stack is preferred, in which the coil cores 205 and the return 207 are designed in sheet metal, i.e., they consist of several thin sheet metal elements, which are stacked.

In order to generate the electromagnetic rotating fields required for the magnetic drive and the magnetic levitation of the rotor 30, the longitudinal limbs 251 of the coil cores 205 carry the windings designed as concentrated windings 206, wherein exactly one concentrated winding 206 is arranged in each case around each longitudinal limb 251 in the embodiment described here. In the operating state, those electromagnetic rotating fields are generated with these concentrated windings 206 with which a torque is effected on the rotor 30 and with which any adjustable transverse force can be exerted on the rotor 30 in the radial direction, so that the radial position of the rotor 30, i.e. its position in the radial plane E perpendicular to the axial direction A, can be actively controlled or regulated. Of course, such embodiments are also possible in which each longitudinal limb 251 has more than one concentrated winding 206, for example, exactly two concentrated windings.

As already mentioned, the magnetically effective core 301 is designed in a permanent magnetic manner. For this purpose, the magnetically effective core 301 can comprise at least one permanent magnet, but also several permanent magnets, or—as in the embodiment described here—consist entirely of a permanent magnetic material, so that the magnetically effective core 301 is the permanent magnet. The magnetization of the magnetically effective core 301 of the rotor 30 is represented in FIG. 6 by the arrow without reference sign in the magnetically effective core 301. The magnetically effective core 301 is thus magnetized in the radial direction.

FIG. 7 shows an embodiment of the centrifugal pump 41, 42 in a section in the axial direction A.

The centrifugal pump 41, 42 comprises a pump unit 40 having a pump housing 60 which comprises the inlet 411; 421 and the outlet 412; 422 for the fluid to be conveyed, wherein the rotor 30 is arranged in the pump housing 60 and comprises a plurality of vanes 305 for conveying the fluid. The pump unit 40 is designed in such a way that the pump unit 40 can be inserted into the stator 20 such that the magnetically effective core 301 of the rotor 30 is surrounded by the end faces of the transverse limbs 252.

The pump housing 60 of the pump unit 40 comprises a base part 601 and a cover 602, which are connected to each other in a sealing manner, wherein the outlet 412; 422 is preferably, but not necessarily, completely arranged in the base part 601 of the pump housing. The cover 602 comprises the inlet 411; 412, which extends in the axial direction A, so that the fluid flows to the rotor 30 from the axial direction A.

The rotor 30 comprises the plurality of vanes 305 for conveying the fluid, for example a total of four vanes 305, whereby this number has an exemplary character. The rotor 30 further comprises a jacket 308 with which the magnetically effective core 301 of the rotor 30 is enclosed and preferably hermetically encapsulated so that the magnetically effective core 301 of the rotor 30 does not come into contact with the fluid to be conveyed. All vanes 305 are arranged on the jacket 308 and arranged equidistantly with respect to the circumferential direction of the rotor 30. Each vane 305 extends outward in the radial direction and is connected to the jacket 308 in a torque-proof manner. The vanes 305 can be separate components that are then fixed to the jacket 308. Of course, it is also possible that all of the vanes 305 are an integral part of the jacket 308, i.e., that the jacket 308 is designed with all of the vanes 305 as a single piece. The rotor 30 with the vanes 305 forms the vane or the impeller, respectively, of the centrifugal pump 41, 42, with which the fluid or fluids are acted upon.

The design of the centrifugal pump 41, 42 with the electromagnetic rotary drive 10 according to the principle of the bearingless motor also allows that the rotor 30 can be separated from the stator 20 very easily. This is a very great advantage, because in this way, for example, the rotor 30 or the pump unit 40 comprising the rotor can be designed as a single-use part for single use. Today, such single-use applications often replace processes in which, due to the very high purity requirements, all those components that come into contact with the substances to be treated in the process previously had to be cleaned and sterilized in an elaborate manner, for example by steam sterilization. When designed for single use, those components that come into contact with the substances to be treated are only used exactly once and are then replaced with new, i.e., unused, single use parts for the next application.

The device according to embodiments of the invention can therefore in particular also be designed in such a way that it comprises a reusable device which is designed for multiple use and a single-use device which is designed for single use. The reusable device comprises in particular those components which do not come into contact with the fluid, i.e., in particular the stators 20 of the centrifugal pumps 41, 42 and for example at least parts of the pressure sensors 71, 72, 73. The pressure sensors 71, 72, 73 can be designed in such a way that they each comprise single-use parts and reusable parts.

It is also possible that the device 1 according to embodiments of the invention further comprises the reservoir 8. Such embodiments are possible in which the entire reservoir 8 is designed as a single-use part, for example as a dimensionally stable plastic container, and such embodiments in which only one component of the reservoir 8 is designed as a single-use part.

Figure 8:
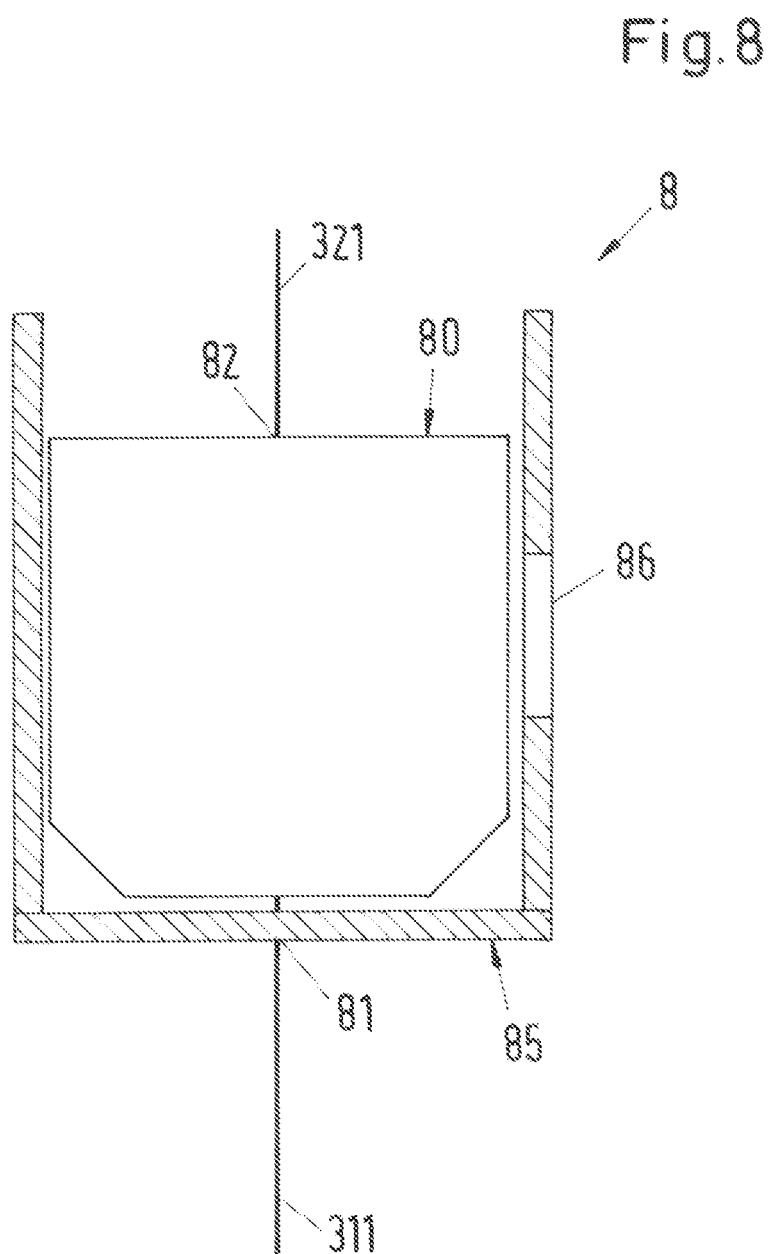
FIG. 8 illustrates an embodiment of a reservoir in a schematic representation.

Such an embodiment of the reservoir S is represented in a schematic representation in FIG. 8. The reservoir 8 comprises a flexible insert 80 for receiving the fluid, which is made of a plastic. The insert 80 is preferably a flexible bag, for example a plastic bag or a synthetic bag, which can be folded so that it requires as little space as possible during storage. The insert 80 can comprise additional inlets or outlets (not shown), for example for supplying additional substances, e.g., nutrient solutions or gases such as oxygen. It is also possible to use a further inlet for receiving probes or measurement sensors with which parameters are monitored, e.g., temperature, pressure, concentrations, etc. The inlet(s) can also be for mass transfer. In particular, necessary gases can be supplied or discharged here, for example in an embodiment as bioreactor. In particular in the cultivation of microorganisms or biological cells, it is often a necessity that oxygen or air can be supplied to the container 80 and other gases, in particular carbon dioxide, can be discharged from the container.

In particular, so-called sampling ports (not shown) can be glued or welded to the reservoir 8 or to the insert 80. These are short tube-like plastic structures through which, for example, samples can be taken from the insert 80. Each sampling port is usually secured by a clamp at its end protruding from the insert 80 in a manner known per se, so that no undesired substances can enter the interior of the insert 80 through these sampling ports.

The reservoir 8 further comprises a dimensionally stable support container 85, which is designed as a reusable component and for receiving the insert 80. At least one window 86 can be provided on the wall of the support container 85, through which a visual access to the insert 80 is possible.

It is understood that also in the very schematic embodiment represented in FIG. 8, each of the two tubes through which the fluid leaves or is returned to the reservoir 8 with the insert 80, namely the return tube 321 and the supply tube 311, can be used respectively both for removing and for returned the fluid. This is because when the device 1 is operated in the alternating mode, the supply tube 311 is used in one operating mode, such as the first operating mode, to remove the fluid from the insert 80, and in the other operating mode, such as the second operating mode, to return the fluid to the insert 80. The same applies analogously to the return tube 321. This means that both tubes 321 and 311 are each designed in particular in such a way that the fluid can be sucked in through them, or other measures are provided, for example in the design of the insert 80, that the fluid can be sucked in through each of the two tubes, namely the supply tube 311 and the return tube 321, i.e. removed as well as returned.

In particular with regard to such embodiments of the device 1, which comprise reusable components for multiple use as well as components for single use, a set of single-use parts for a device 1 according to embodiments of the invention is further proposed, which comprises at least the following components, which are each designed as single-use parts: the filter unit 2, a pump unit 40 for each centrifugal pump 41, 42, a plurality of tubes 311, 312, 321, 322 which are designed to realize the first flow connection 31 and the second flow connection, and optionally a reservoir 8 for the fluid or an insert 80 for a reservoir 8.

A further substantial aspect is that all parts of the device 1 for tangential flow filtration which come into contact with the fluid, in particular also the filter unit 2 or the filter element 25, the reservoir 8, or the insert 80 designed as a plastic bag, the flow connections 31, 32, if necessary the pressure sensors 71, 72, 73 and the pump units 40 of the centrifugal pumps 41 and 42 or their components are to be sterilizable for certain fields of application. It is particularly advantageous if all the components mentioned can be gamma sterilizable. In this type of sterilization, the component to be sterilized is exposed to gamma radiation. The advantage of gamma sterilization, for example in comparison with steam sterilization, is in particular that sterilization can also take place through the packaging. For single-use parts in particular, it is a common practice that the parts are placed in the packaging intended for shipping after they are manufactured and then stored for a period of time before being shipped to the customer. In such cases, sterilization takes place through the packaging just before delivery to the customer, which is not possible with steam sterilization or other processes.

On the other hand, because the pump unit 40 can be used only once, it offers the great advantage that it is not necessary to attach importance to good cleanability of the pump unit 40 in the design, because the pump unit 40 does not have to be cleaned when used as intended. Furthermore, it is generally not necessary that the pump unit 40 or its components must be sterilizable more than once. This is a great advantage, in particular for gamma sterilization, because exposure to gamma radiation can cause degradation in plastics, so that multiple gamma sterilization can make the plastic unusable.

Since sterilization under high temperatures and/or under high (steam) pressure can usually be dispensed with for single-use parts, less expensive plastics can be used, for example those that cannot withstand high temperatures or that cannot be subjected to multiple high temperature and pressure levels.

Considering all these aspects, it is therefore preferred to use such plastics that can be gamma-sterilized at least once for the manufacture of the single-use device or the single-use parts. The materials should be gamma-stable for a dose of at least 40 kGy to enable a single gamma sterilization. In addition, no toxic substances should be generated during gamma sterilization. In addition, it is preferred that all materials that come into contact with the substances to be mixed or the intermixed substances meet USP Class VI standards.

For example, the following plastics are preferred for manufacturing the parts of the pump unit 40 that are made of plastic: PolyPropylene (PP), Low Density PolyEthylene (LDPE), Ultra Low Density PolyEthylene (ULDPE), Ethylene Vinyl Acetate (EVA), PolyEthylene Terephthalate (PET), PolyVinylChlorid (PVC), PolyVinyliDene Fluoride (PVDF), Acrylonitrile Butadiene Styrene (ABS), PolyAcryl, PolyCarbonate (PC).

Less suitable or even unsuitable materials for manufacturing the plastic parts of the single-use device 70 are, for example, the materials known under the brand name Teflon, polytetrafluoroethylene (PTFE) and perfluoroalkoxy polymers (PFA). In the case of these materials, there is in fact a risk during gamma sterilization that hazardous gases escape, such as fluorine, which can then form toxic or harmful compounds such as hydrofluoric acid (HF).

What is claimed is:

1. A device for tangential flow filtration of a fluid, comprising:
    a filter unit having a first fluid opening and a second fluid opening for the fluid, as a filter element and a permeate opening configured to discharge a permeate filtered out of the fluid;
    a first flow connection by which the first fluid opening is capable of being connected to a reservoir for the fluid;
    a second flow connection by which the second fluid opening is capable of being connected to the reservoir for the fluid;
    a first centrifugal pump disposed in the first flow connection, with which the fluid is capable of being conveyed from the reservoir to the filter unit;
    a first controller configured to actuate the first centrifugal pump, the filter unit configured such that the fluid for tangential flow filtration in the filter unit is capable of flow substantially parallel to the filter element;
    a second centrifugal pump for the fluid disposed in the second flow connection, which a counter-pressure is configured to be generated at the second fluid opening; and
    a second controller configured to actuate the second centrifugal pump.

2. The device according to claim 1, further comprising a flow sensor configured to determine a flow rate of the fluid through the first flow connection, the first controller configured to adjust a desired value for the flow rate via an operating parameter of the first centrifugal pump.

3. The device according to claim 1, further including a plurality of pressure sensors arranged and configured to determine a transmembrane pressure via the filter element, and the second controller is configured to adjust a desired value for the transmembrane pressure via an operating parameter of the second centrifugal pump.

4. The device according to claim 3, wherein the plurality of the pressure sensors comprises a first pressure sensor configured to determine a first pressure of the fluid at the first fluid opening, and a second pressure sensor configured to determine a second pressure of the fluid at the second fluid opening, and a third pressure sensor configured to determine a third pressure of the fluid at the permeate opening.

5. The device according to claim 1, further comprising a central controller signal-connected to the first controller and to the second controller, and the central controller configured to actuate the first controller and the second controller.

6. The device according to claim 1, wherein the second centrifugal pump comprises a rotor configured to convey the fluid, and a stator which forms with the rotor an electromagnetic rotary drive configured to rotate the rotor about an axial direction, the rotor comprises a magnetically effective core, and a plurality of vanes configured to convey the fluid, and the stator is a bearing and drive stator with which the rotor is capable of being magnetically driven without contact and magnetically levitated without contact with respect to the stator.

7. The device according to claim 1, wherein the first centrifugal pump comprises a rotor configured to convey the fluid, and a stator which forms with the rotor an electromagnetic rotary drive configured to rotate the rotor about an axial direction, the rotor comprises a magnetically effective core, and a plurality of vanes configured to convey the fluid, and the stator is a bearing and drive stator with which the rotor is capable of being magnetically driven without contact and magnetically levitated without contact with respect to the stator.

8. The device according to claim 6, wherein the second centrifugal pump comprises in a pump unit having a pump housing, the pump housing comprises an inlet and an outlet for the fluid to be conveyed, the rotor is arranged in the pump housing, and the pump unit is configured to be inserted into the stator.

9. A set of single-use parts for the device according to claim 8, comprising:
    the filter unit;
    the pump unit; and
    a plurality of tubes configured to enable the first flow connection and the second flow connection.

10. The device according to claim 1, further comprising a flow sensor configured to determine a flow rate of the fluid through the first flow connection, the first controller configured to adjust a desired value for the flow rate via a rotational speed of the first centrifugal pump.

11. The device according to claim 1, further including a plurality of pressure sensors arranged and configured to determine a transmembrane pressure via the filter element, and the second controller is configured to adjust a desired value for the transmembrane pressure via a rotational speed of the second centrifugal pump.

12. The set of single-use parts for the device according to claim 9, further comprising the reservoir for the fluid or an insert for the reservoir.

13. The device according to claim 1, further comprising a central control unit configured to actuate the first and second control units in a coordinated manner.

* * * * *